(12) United States Patent
Matsuura et al.

(10) Patent No.: US 10,086,816 B2
(45) Date of Patent: Oct. 2, 2018

(54) BRAKE APPARATUS AND METHOD FOR DETECTING AIR IN PIPELINES OF THE BRAKE APPARATUS

(71) Applicant: HITACHI AUTOMOTIVE SYSTEMS, LTD., Ibaraki (JP)

(72) Inventors: Makoto Matsuura, Tokyo (JP); Daisuke Goto, Atsugi-shi (JP); Tohma Yamaguchi, Kawasaki (JP); Tatsuji Ohkubo, Maebashi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/778,735

(22) PCT Filed: Mar. 26, 2014

(86) PCT No.: PCT/JP2014/058515
§ 371 (c)(1),
(2) Date: Sep. 21, 2015

(87) PCT Pub. No.: WO2014/157327
PCT Pub. Date: Oct. 2, 2014

(65) Prior Publication Data
US 2016/0046274 A1   Feb. 18, 2016

(30) Foreign Application Priority Data

Mar. 29, 2013   (JP) .................................. 2013-072908

(51) Int. Cl.
*B60T 17/22* (2006.01)
*B60T 13/66* (2006.01)
(Continued)

(52) U.S. Cl.
CPC .......... *B60T 17/222* (2013.01); *B60T 13/662* (2013.01); *B60T 13/686* (2013.01); *B60T 13/745* (2013.01); *B60T 17/22* (2013.01)

(58) Field of Classification Search
CPC ...... B60T 17/22; B60T 17/221–17/223; B60T 13/662; B60T 13/686; B60T 13/745
See application file for complete search history.

(56) References Cited

U.S. PATENT DOCUMENTS 5,767,397 A * 6/1998 Eisele ................... B60T 17/221
340/452
2001/0006308 A1   7/2001 Kawahata et al.
(Continued)

FOREIGN PATENT DOCUMENTS

| JP | 2001-180463 | 7/2001 |
| JP | 2005-254898 | 9/2005 |
| JP | 2007-182171 | 7/2007 |

OTHER PUBLICATIONS

International Search Report dated Jun. 17, 2014 in International Application No. PCT/JP2014/058515.

*Primary Examiner* — Aaron L Troost
(74) *Attorney, Agent, or Firm* — Wenderoth, Lind & Ponack, L.L.P.

(57) ABSTRACT

An ECU (19) outputs control signals to an electric booster (16) of a fluid-pressure generating device (5) and to an ESC (22). In this way, the establishment and cutting off of communication through pressure-increase control valves (29), (29'), (31), and (31') of the ESC (22) are controlled to connect each of wheel cylinders (1) to (4) in turn to the master cylinder (8). In doing so, the electric booster (16) is controlled for each of the wheel cylinders (1) to (4) to measure a stroke of a piston (10), (11) of a master cylinder (8), or a volume of brake fluid proportional to the stroke of the piston (10), (11), and a fluid pressure detected by (Continued)

fluid-pressure sensors (20) and (21). The fluid volume-pressure characteristic of each of the wheel cylinders (1) to (4) so determined is used for comparison to detect any atmospheric air in each pipeline.

7 Claims, 7 Drawing Sheets

(51) Int. Cl.
*B60T 13/68* (2006.01)
*B60T 13/74* (2006.01)

(56) References Cited

U.S. PATENT DOCUMENTS

| | | | |
|---|---|---|---|
| 2005/0184585 A1* | 8/2005 | Bayer | B60T 8/34 303/191 |
| 2006/0163941 A1* | 7/2006 | Von Hayn | B60T 7/042 303/155 |
| 2009/0032136 A1* | 2/2009 | Petty | B60T 17/222 141/59 |
| 2011/0022248 A1* | 1/2011 | McQuade | G06Q 10/06 701/2 |

* cited by examiner

BRAKE APPARATUS AND METHOD FOR DETECTING AIR IN PIPELINES OF THE BRAKE APPARATUS

TECHNICAL FIELD

The present invention relates to a brake apparatus suitable for applying brake force to a vehicle and a method, for detecting air in pipelines of the brake apparatus.

BACKGROUND ART

In general, brake apparatuses of vehicles are configured to generate the pressure of brake fluid in the master cylinder in response to brake pedal operation and distribute the fluid pressure to wheel cylinders through a plurality of pipelines. Any air in the pipelines would cause a time delay between the start of brake application and the actual start of braking, which in turn causes problems; for example, the driver may feel that something is wrong in the brake pedal operation.

To solve such problems, conventional brake apparatuses are configured to detect the presence of any air in the pipelines by computing response speed of a change in fluid pressure when transmitting fluid pressure from the master cylinder to the brake pipelines (see Patent Document 1 listed below).

CITATION LIST

Patent Document

Patent Document 1: Japanese Patent Public Disclosure No. 2007-182171

SUMMARY OF INVENTION

A problem with such conventional techniques for detecting air in the brake pipelines, determining the presence of any air on the basis of a change in the pressure of brake fluid, is that they are liable to cause discrepancies in results of determination that are affected by changes in the surrounding environment, etc., making it difficult to improve the accuracy of air detection.

The present invention is made in view of the problem with conventional techniques described above. An object of the present invention is to provide a brake apparatus that detects with improved accuracy air in the pipelines on the basis of a relation between the volume of brake fluid and fluid pressure, and a method for detecting atmospheric air in the pipelines of the brake apparatus.

To solve the above-described problem, a brake apparatus of the present invention comprises: a fluid-pressure generating apparatus configured to supply brake fluid through a pipeline to a wheel cylinder; a controller configured to control a signal to the fluid-pressure generating apparatus, the controller being configured to control a volume of brake fluid supplied by the fluid-pressure generating apparatus; a fluid-pressure defection unit configured to detect a pressure of brake fluid when the brake fluid is being transmitted from the fluid-pressure generating apparatus toward the wheel cylinder; and an air detection unit configured to determine the presence of any air in the pipeline on the basis of a relation between the volume of brake fluid when the controller controls one fluid-pressure generating apparatus to generate the volume of brake fluid and the fluid pressure detected by the fluid-pressure detection unit.

Another brake apparatus of the present invention comprises: a master cylinder configured to supply a pressure of brake fluid to at least two wheel cylinders by generating a pressure of brake fluid through movement of a piston; a booster for moving the piston of the master cylinder; a controller configured to control the booster on the basis of brake pedal operation, the controller being configured to control a volume of brake fluid supplied from the master cylinder by controlling a stroke of the piston; a valve mechanism disposed to establish and cut off communication through a pipeline between the master cylinder and each of the wheel cylinders on the basis of a signal from the controller; and fluid-pressure detection unit configured to detect a pressure of brake fluid when it is transmitted from the master cylinder toward each of the wheel cylinders and sending a detection signal to the controller, wherein the controller controls establishment and cutting off or communication through the valve mechanism to connect each of the wheel cylinders to the master cylinder in turn, and the booster is controlled for each wheel cylinder to determine a characteristic of a piston stroke of the master cylinder and a fluid pressure detected by the fluid-pressure detection unit, thereby defecting any atmospheric air in each of the pipelines on the basis of the characteristic of each wheel cylinder.

The present invention also provides a method for detecting atmospheric air in a pipeline of a brake apparatus comprising: a fluid-pressure generating device configured to supply brake fluid through the pipeline to a wheel cylinder; and a controller configured to control the fluid-pressure generating device, the controller being configured to control a volume of brake fluid supplied by the fluid-pressure generating device, the method comprising: supplying a predetermined volume of brake fluid from the fluid-pressure generating device through the pipeline to the wheel cylinder; detecting a pressure of brake fluid when the brake fluid is supplied by the fluid-pressure generating device toward the wheel cylinder; and detecting any atmospheric air in the pipeline on the basis of a relation between the volume of brake fluid supplied by the fluid-pressure generating device and the detected pressure of brake fluid.

According to the present invention, the detection of atmospheric air in a pipeline on the basis of a relation between a volume of brake fluid and a fluid pressure improves the accuracy of detection of atmospheric air.

DESCRIPTION OF EMBODIMENTS

Below, the embodiments of the brake apparatus of the present invention mounted in a four-wheeled vehicle are described for illustration purposes with reference to the accompanying drawings.

Figure 1:
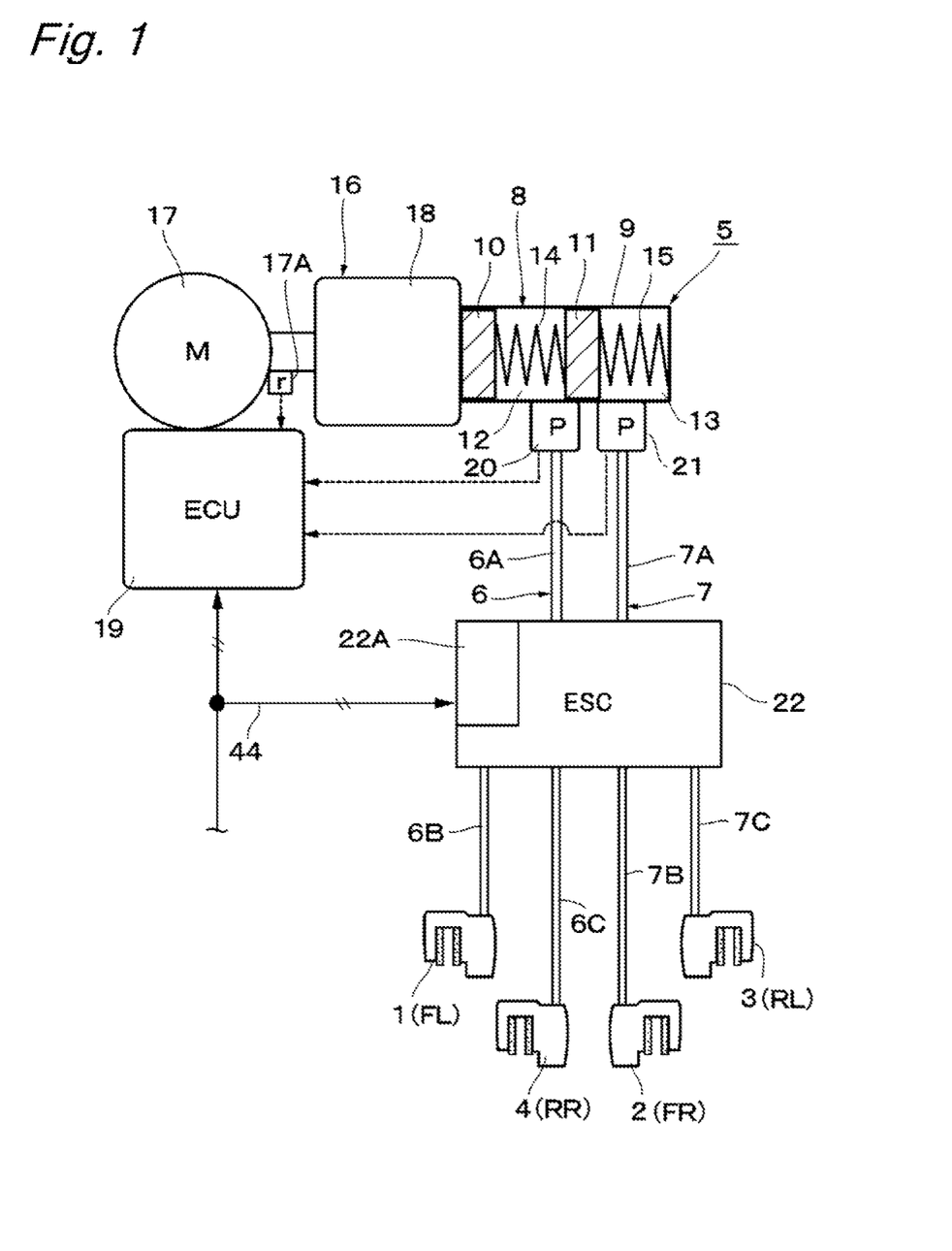
FIG. 1 is an overall structural view of a brake apparatus according to a first embodiment.

FIGS. 1 to 4 show the brake apparatus according to the first embodiment. In FIG. 1, front wheel cylinders 1 and 2 are provided on the sides of left and right front wheels (FL, FR), and rear wheel cylinders 3 and 4 on the sides of left and right rear wheels (RL, RR). The wheel cylinders 1 to 4 are for use in a hydraulic disc brake or drum brake to apply brake force to each wheel (left and right front wheels and left and right rear wheels) at the bottom of the body (not shown) of a vehicle.

Numeral 5 indicates a fluid-pressure generating device configured to supply brake fluid via brake pipelines 6 and 7 to the wheel cylinders 1 to 4, the fluid-pressure generating device 5 comprising a master cylinder 8 and an electric booster 16 and an ESC 22, described later. The brake pipelines 6 and 7 comprise: master-side pipelines 6A and 7A connecting the master cylinder 8 and the ESC 22; wheel-side pipelines 6B, 6C, 7B, and 7C; and brake pipelines 24 and 24' (including first pipe parts 25 and 25' and second pipe parts 26 and 26') of the ESC 22. The wheel-side pipelines 6B and 6C connect the ESC 22 and wheel cylinders 1 and 4, and the wheel-side pipelines 7B and 7C connect the ESC 22 and the wheel cylinders 2 and 3.

The master cylinder 8 comprises: a bottomed tubular cylinder body 9 with one end open and the other end closed to form the bottom; a first piston 10 and a second piston 11 slidably housed in the cylinder body 9; first and second hydraulic chambers 12 and 13 defined in the cylinder body 9 by the pistons 10 and 11; and first and second return springs 14 and 15.

The first hydraulic chamber 12 in the cylinder body 9 is defined between the first piston 10 and the second piston 11. The second hydraulic chamber 13 is defined in the cylinder body 9 between the bottom of the cylinder body 9 and the second piston 11. The first return spring 14 is located in the first hydraulic chamber 12 between the first and second pistons 10 and 11 to urge the first piston 10 toward the open end of the cylinder body 9. The second return spring 15 is located in the second hydraulic chamber 13 between the bottom of the cylinder body 9 and the second piston 11 to urge the second piston 11 toward the first hydraulic chamber 12.

The cylinder body 9 of the master cylinder 8 has a reservoir (not shown) serving as a working-fluid tank storing brake fluid, the reservoir supplying and withdrawing brake fluid to and from the hydraulic chambers 12 and 13 in the cylinder body 9. The pressures of brake fluid generated in the hydraulic chambers 12 and 13 are transmitted via the pair of master-side pipelines 6A and 7A to the ESC 22, described later.

The electric booster 16 comprises: an electric motor 17 serving as an actuator; a rotary-to-liner converter 18 for reducing the rotating speed of the electric motor 17 and converting the rotation into axial displacement (forward/backward movement) of the first piston 10. The electric motor 17 rotates on electric power supplied by a controller 19, described later. The electric motor 17 has a resolver 17A on its rotary shaft, the resolver 17A detecting the rotational position of the rotary shaft. The rotary-to-liner converter 18 uses, for example, a ball screw mechanism or the like. The rotary-to-linear converter 18 used in this embodiment may be any mechanism, for example, a rack-and-pinion mechanism or the like, as long as it can convert the rotary motion of the electric motor 17 into axial displacement (forward/backward movement) of the first piston 10. The electric motor 17 and the rotary-to-linear converter 18 may be provided therebetween with a speed reducer for reducing the rotational speed of the motor, as required.

The controller 19 (hereinafter "ECU 19") controls the fluid-pressure generating device 5 on the basis of the operation of the brake pedal (not shown). The ECU 19 has the function of variably controlling the volume or amount of brake fluid supplied to the wheel cylinders 1 to 4 from the fluid-pressure generating device 5. That is, the ECU 19 controls rotation of the electric motor 17 based on operation of the brake pedal (a brake command) using values detected by a resolver 17A and fluid-pressure sensors 20 and 21, described later. At this stage, the rotary-to-linear converter 18, which converts rotation of the electric motor 17 into an axial displacement, axially displaces the first piston 10 in the cylinder body 9. This axial displacement of the first piston 10 is transmitted via the return spring 14 to the second piston 11, which in turn, together with a pressure of brake fluid generated in the hydraulic chamber 12, axially displaces the second piston 11 in the cylinder body 9. Other than the brake command made by brake pedal operation, the ECU 19 is also configured to control the rotation of the electric motor 17 in response to a brake command from an external device to perform automatic braking or the like independent of brake pedal operation.

For such control, brake fluid is transmitted from the cylinder body 9 of the master cylinder 8 into the master-side pipelines 6A and 7A. The volume of brake fluid transmitted is proportional to the stroke of the pistons 10 and 11 and can be calculated from the outer diameter of the pistons 10 and 11 and the stroke. The stroke of the pistons 10 and 11 can be determined on the basis of a signal detected by the resolver 17A, detecting the rotational position of the rotary shaft of the electric motor 17. In the case of an electric booster, such as the one disclosed in Japanese Patent Public Disclosure No. 2008-162482, having a tip of an input member facing a hydraulic chamber of a master cylinder, the volume of brake fluid can be determined from detection signals from an operation amount sensor (not shown) configured to detect the amount of operation of the brake pedal and from the resolver 17A.

The ECU 19, which comprises, for example, a microcomputer or the like, electrically controls the operation of the electric booster 16 (or the electric motor 17) of the fluid-pressure generating device 5 on the basis of the operation of the brake pedal and outputs a control command to an ESC 22, described later. The ECU 19 is connected on the input side to the operation amount sensor, resolver 17A, hydraulic sensors 20 and 21 (described later), etc. and on the output side to the electric motor 17, ESC 22, etc.

The ECU 19 comprises a storage (not shown) comprising, for example, ROM, RAM, a non-volatile memory, or the like. The storage stores: a program (see FIG. 3) for determining whether any atmospheric air is present in the brake pipelines 6 and 7; a characteristic curve (see FIG. 4) showing a relation between the amount of brake fluid supplied in the pipelines 6 and 7 and fluid pressure, etc. The ECU 19 so configured forms air detection unit configured to detect the presence of air in the brake pipelines 6 and 7 on the basis of the relation between the volume of brake fluid and fluid pressure.

The fluid-pressure sensors 20 and 21 form fluid-pressure detection unit to detect a pressure of brake fluid generated in the brake pipelines 6 and 7 between the wheel cylinders 1 to 4 and the fluid-pressure generating device 5. The fluid-pressure sensor 20 detects the pressure of brake fluid transmitted from the first hydraulic chamber 12 of the master cylinder 8 via the master-side pipeline 6A toward the ESC 22, described later. The fluid-pressure sensor 21 detects the pressure of brake fluid transmitted from the second hydraulic chamber 13 of the master cylinder 8 via the master-side pipeline 7A toward the ESC 22, described later. Detection signals from the fluid-pressure sensors 20 and 21 are transmitted via a signal line (not shown) to the ECU 19.

In the following, the fluid-pressure supply device 22 (hereinafter "ESC 22") disposed between the wheel cylinders 1 to 4 for the respective wheels of the vehicle and the master cylinder 8 will be described with reference to FIG. 2. The ESC 22 forms a wheel-cylinder pressure controller that variably controls the pressure of brake fluid generated in the master cylinder 8 (first and second hydraulic chambers 12 and 13) by the electric booster 16 as a pressure in the wheel cylinder on each wheel and to individually supply the pressure to the wheel cylinders 1 to 4 on the respective wheels.

In other words, the ESC 22 has the function of supplying a required pressure or required pressures of brake fluid through the wheel-side pipelines 6B, 6C, 7B, and 7C to the wheel cylinders 1 to 4 in various modes of control (for example, braking-force distribution control for distributing brake force to each of the left and right front wheels and left and right rear wheels, anti-lock brake control, vehicle stabilization control, etc.). The ESC 22 is configured to select any one or more of the plurality of wheel cylinders 1 to 4 to be supplied with brake fluid.

The ESC 22 distributes and supply fluid pressure output through the master-side pipelines 6A and 7A by the master cylinder 8 (first and second hydraulic chambers 12 and 13) to the wheel cylinders 1 to 4 via the wheel-side pipelines 68, 6C, 7B, and 7C. In this way, the application of braking force to each wheel independent of the other wheels, as described above, is achieved. The ESC 22 comprises control valves 27, 27', 29, 29', 31, 31', 35, 35', 36, and 36', described later, on-off valves 43 and 43', an electric motor 38 for actuating hydraulic pumps 37 and 37', a control board 22A (hereinafter "ECU 22A") configured to control these valves and motor, etc. The ESC 22 also, has reservoirs 42 and 42' for fluid pressure control.

The ESC 22 comprises a dual hydraulic circuit comprising: a first hydraulic system 23 connected to a bleed port (or master-side pipeline 6A) of the master cylinder 8 to supply fluid pressure to the wheel cylinder 1 on the left front wheel (FL) and the wheel cylinder 4 on the right rear wheel (RR); and a second hydraulic system 23' connected to another bleed port (or master-side pipeline 7A) to supply fluid pressure to the wheel cylinder 2 on the right front wheel (FR) and the wheel cylinder 3 on the left rear wheel (RL). Since the first and second hydraulic systems are of the same construction, the description below refers to only the first hydraulic system 23, and the elements of the second hydraulic system 23' are indicated by a prime "'", but the description thereof is omitted.

The first hydraulic system 23 of the ESC 22 has a brake pipeline 24 connected to a distal end of the master-side pipeline 6A, the brake pipeline 24 bifurcating into a first pipe part 25 and a second pipe part 26. The first pipe part 25 is connected via the wheel-side pipeline 6B to the wheel cylinder 1, and the second pipe part 26 is connected via the wheel-side pipeline 6C to the wheel cylinder 4. The brake pipeline 24 and the first pipe part 25, together with the wheel-side pipeline SB, form a passage (part of the pipeline 6) to supply fluid pressure to the wheel cylinder 1. Likewise, the brake pipeline 24 and the second pipe part 26, together with the wheel-side pipeline 6C, form another passage (part of the pipeline 6) to supply fluid pressure to the wheel cylinder 4.

The brake pipeline 24 is provided with a supply control valve 27 for brake fluid pressure and a check valve 28, which are arranged in parallel. The supply control valve 27 is controlled by the ECU 22A and comprises a normally open electromagnetic switching valve that establishes and cuts off communication through the brake pipeline 24 at an intermediate point thereof. The supply control valve 27 forms a valve mechanism that controls via the ECU 22A the establishment and cutting off of communication through the brake pipeline 24 on the basis of a control signal from the ECU 19. The check valve 28 allows brake fluid to flow from the master cylinder 8 into the brake pipeline 24, but prevents brake fluid from flowing in the opposite direction.

The first pipe part 25 is provided with a pressure-increase control valve 29 and a check valve 30, which are arranged in parallel. The pressure-increase control valve 29 is controlled by the ECU 22A and comprises a normally open electromagnetic control valve that establishes and outs off communication through the first pipe part 25 at an intermediate point thereof. The pressure-increase control valve 29 forms a valve mechanism that controls via the ECU 22A the establishment and cutting off of communication through the first pipe part 25 on the basis of a control signal from the ECU 19. The check valve 30 allows brake fluid to flow from the wheel cylinder 1 toward the first pipe part 25 and the brake pipeline 24, but prevents brake fluid from flowing in the opposite direction.

The second pipe part 26 is provided with a pressure-increase control valve 31 and a check valve 32, which are arranged in parallel. The pressure-increase control valve 31 is controlled by the ECU 22A and comprises a normally open electromagnetic control valve that establishes and cuts off, communication through the second pipe part 26 at an intermediate point thereof. The pressure-increase control valve 31 forms a valve mechanism that controls via the ECU 22A the establishment and cutting off of communication through the second pipe part 26 on the basis of a control signal from the ECU 19. The check valve 32 allows brake fluid to flow from the wheel cylinder 4 toward the second pipe part 26 and the brake pipeline 24, but prevents brake fluid from flowing in the opposite direction.

The first hydraulic system 23 of the ESC 22 comprises first and second pressure-reduction pipelines 33 and 34 connecting the wheel cylinders 1 and 4, respectively, to a reservoir 42. The pressure-reduction pipelines 33 and 34 are provided with first and second pressure-reduction control valves 35 and 36, respectively. The first and second pressure-reduction control valves 35 and 36 are controlled by the ECU 22A and comprise normally closed electromagnetic switching valves that establish and cut off the communication through the pressure-reduction control pipelines 33 and 34 at intermediate points thereof, respectively.

The ESC 22 comprises a hydraulic pump 37, serving as a fluid pressure source, the hydraulic pump 37 being actuated by an electric motor 38 to rotate. The electric motor 38 is driven by power supplied from the ECU 22A and, when the power supply is stopped, stops rotating with the hydraulic pump 37. The hydraulic pump 37 is connected on the outlet side, via the check valve 39, to a position along the brake pipeline 24 downstream of the supply control valve 27 (i.e. the point bifurcating into the first and second pipe sections 25 and 25). The hydraulic pump 37 is connected on the intake side to the reservoir 42 for fluid pressure control via the check valves 40 and 41.

The reservoir 42 for fluid pressure control is used for temporary storage of excess brake fluid flowing out of the wheel cylinders 1 and 4, not only at the time of ABS control of the brake system (ESC 22), but also at the time of other modes of brake control. The hydraulic pump 37 is connected on the intake side to the master-side pipeline 6A (at a position along the brake pipeline 24 upstream of the supply control valve 27) of the master cylinder 8 via the check valve 40 and an on-off valve 43, which is a normally closed electromagnetic switching valve.

The control valves 27, 27', 29, 29', 31, 31', 35, 35', 36 and 36', on-off valves 43 and 43', and the electric motor 38 for actuating the hydraulic pumps 37 and 37' of the ESC 22 goes through a predetermined procedure to control the operation of the valves individually by the ECU 22A. The control valves 27, 27', 29, 29', 31, and 31' are controlled via the ECU 22A in accordance with a control signal from the ECU 19.

In normal operation by the driver's brake application, the first hydraulic system 23 of the ECU 22 supplies fluid pressure generated in the master cylinder 8 by the electric booster 16, via the bake pipeline 24 and the first and second pipe parts 25 and 26 to the wheel cylinders 1 and 4 directly. For example, in anti-skid control or the like, the fluid pressure in the wheel cylinders 1 and 4 is retained by closing the pressure-increase control valves 29 and 31, and the fluid pressure in the wheel cylinders 1 and 4 are reduced by opening the pressure-reduction control valves 35 and 36 to let the fluid pressure escape from the wheel cylinders 1 and 4 into the reservoir 42 for fluid pressure control.

To increase the fluid pressure supplied to the wheel cylinders 1 and 4 for stabilizing control (antiskid control) or the like while the vehicle is running, the ECU 22A actuates the hydraulic pump 37 with the electric motor 38, with the supply control valve 27 closed. This enables the ESC 22 to supply brake fluid pumped out by the hydraulic pump 37 to the wheel cylinders 1 and 4 via the first and second pipe parts 25 and 26. Meanwhile, the on-off valve 43 is opened to transmit brake fluid in the reservoir from the master cylinder 8 side toward the intake side of the hydraulic pump 37.

In this manner, the ECU 22A controls the operation of the supply control valve 27, pressure-increase control valves 29 and 31, pressure-reduction control valves 35 and 36, on-off valve 43, and the electric motor 38 (or the hydraulic pump 37) on the basis of vehicle driving information or the like to retain, reduce, or increase the fluid pressure supplied to the wheel cylinders 1 and 4, as required. This enables the brake-force distribution control, vehicle stabilizing control, brake assist control, anti-skid control, traction control, hill-start aid control, and other controls described earlier.

In a normal braking mode with the electric motor 38 (or the hydraulic pump 37) turned off, the supply control valve 27 and pressure-increase valves 29 and 31 are opened, and the pressure-reduction control valves 35 and 36 and on-off valve 43 are closed. When in this condition the first and second pistons 10 and 11 of the master cylinder 8 moves axially in the cylinder body 9 in response to the brake pedal being stepped on, the pressure of brake fluid generated in the first and second hydraulic chambers 12 and 13 is transmitted from the master-side pipeline 6A through the first hydraulic system 23 of the ESC 22 and the wheel-side pipelines 6B and 6C to the wheel cylinders 1 and 4. The pressure of brake fluid generated in the second hydraulic chamber 13 is transmitted from the master-side pipeline 7A via the second hydraulic system 23' and the wheel-side pipelines 7B and 7C to the wheel cylinders 2 and 3.

The control valves 27, 27', 29, 29', 31, 31', 35, 35', 36, and 36' and on-off valves 43 and 43' of the ESC 22 may provided, as required, with properties suitable for respective uses. Of these valves, the supply control valves 27 and 27' and pressure-increase control valves 29, 29', 31, and 31' are formed to be normally open, while the pressure-reduction control valves 35, 35', 36, and 36' and on-off valves 43 and 43' are formed to be normally closed, in order for the master cylinder 8 to supply fluid pressure to the wheel cylinders 1 to 4 even when the ECU 22 is not in operation. This feature is desirable in view of the fail-safe function and control efficiency of the brake apparatus.

The ECU 19 and ECU 22A are interconnected by a signal line 44 for CAN communication or the like, as shown in FIG. 1. The ECU 19 feeds a control signal to the ECU 22A to control the control valves 27, 27', 29, 29', 31, 31', 35, 35', 36, and 36', on-off valves 43 and 43', electric motor 38, etc. of the ESC 22.

Figure 4:
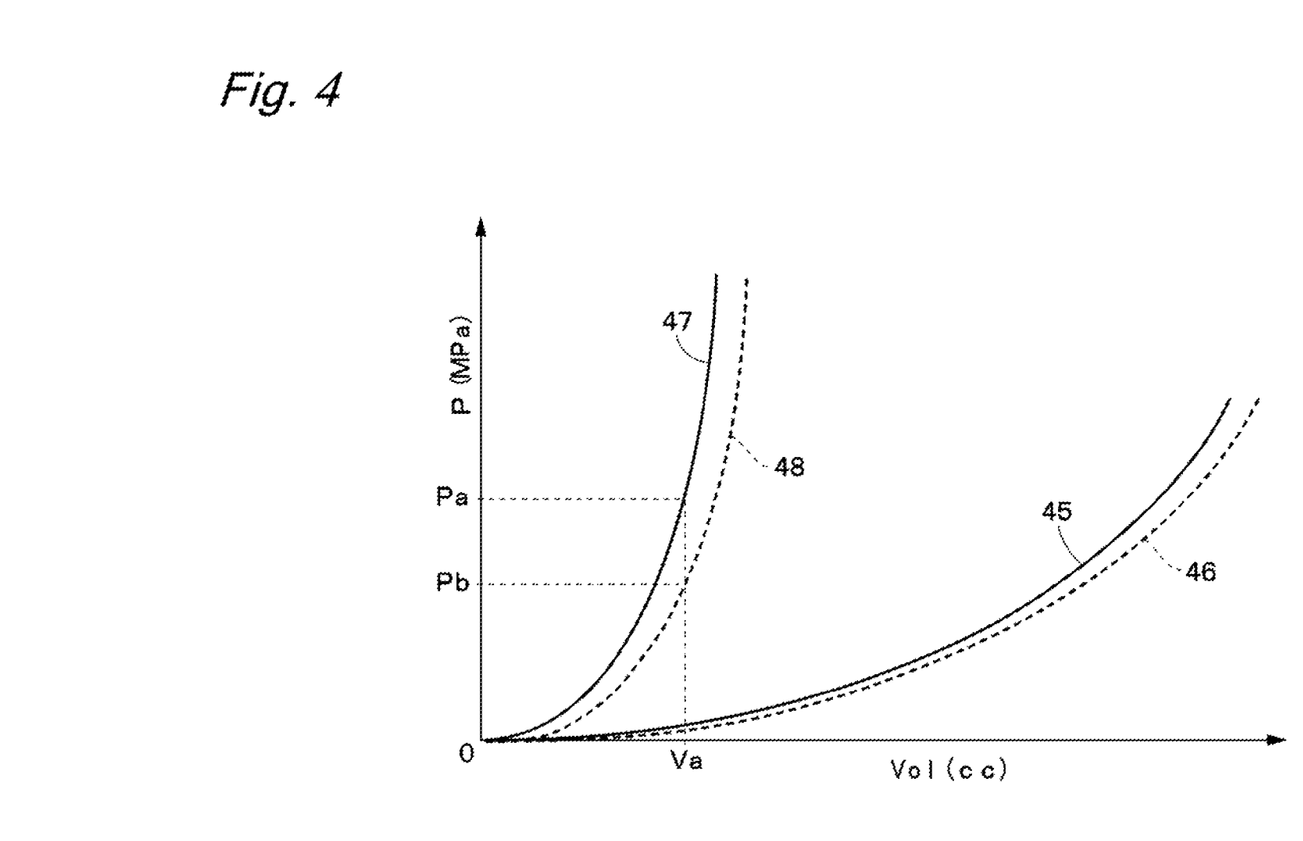
FIG. 4 shows characteristic curves of the relation between the volume of brake fluid supplied to a brake pipeline and fluid pressure.

The characteristic curves 43 and 46 in FIG. 4 represent characteristics exhibited when brake fluid is transmitted from the cylinder body 9 of the master cylinder 8 into both of the brake pipelines 6 and 7, that is, the relation between the volume Vol (in cc) of brake fluid and its pressure P (in MPa). The fluid pressure P in the brake pipelines 6 and 7 can be determined with the aid of the fluid pressure sensors 20 and 21. The volume Vol of brake fluid can be determined through computation by detection of the stroke of the pistons 10 and 11, i.e., the rotational position of the electric motor 17.

The solid characteristic curve 45 represents a characteristic of the absence of air in the brake pipelines 6 and 7 of all of the four wheels, and the dashed characteristic line 46 represents a characteristic of the presence of air in the brake pipeline 6 or 7 of any wheel. As shown, air in the brake pipeline 6 or 7 renders the slope of the rising curve of fluid pressure P relative to fluid volume Vol, as in the dashed characteristic curve 46, less steep. However, since the characteristic curves 45 and 46 represent characteristics of brake fluid supply into the brake pipelines 6 and 7 of all of the four wheels, and the rise of fluid pressure P relative to fluid volume Vol is moderate, the difference between the two characteristics may not be substantial.

In contrast, the characteristic curves 47 and 48 in FIG. 4 represent characteristics exhibited when fluid pressure is applied to only the cylinder on one wheel (e.g., the wheel cylinder 1 on the FL side), rather than all four wheels, while the other wheel cylinders 2 to 4 are cut off from fluid pressure supply. This manner of application steepens the rise of fluid pressure P relative to fluid volume Vol, rendering the difference between the solid characteristic curve 47 (representing the absence of air) and the dashed characteristic curve 48 (the presence of air) large.

The relations between brake fluid volume Vol and brake fluid pressure P represented by the characteristic curves 45 to 48 in FIG. 4 are the ones when the fluid-pressure generating device 5 (more specifically, the electric booster 16) is controlled in response to a control signal from the ECU 19 to supply brake fluid to the wheel cylinders 1 to 4 to bring the volume of brake fluid occurring in (communicating through) the brake pipelines 6 and 7 to a certain value. These relations are derived from vehicle specifics, empirical values thus far gathered, experimental data, etc.

The brake apparatus according to the first embodiment so configured operates in the manner as described below.

For example, when the driver of the vehicle has stepped on the brake pedal, the ECU 19 sends a start-up command corresponding to the pedal operation amount to the electric motor 17 of the electric booster 16. This drives the electric motor 17 to the rotational angle corresponding to the start-up command. The rotation of the electric motor 17 is converted by the rotary-to-linier converter 18 into an axial displacement of the first piston 10.

The first piston 10 of the electric booster 16 thus moves forward into the cylinder body 9 of the master cylinder 8, and the second piston 11 moves forward in a similar manner. This generates a pressure of brake fluid in the first and second hydraulic chambers 12 and 13 of the master cylinder 8 corresponding to the rotational angle (rotational position) of the electric motor 17. The ECU 19 monitors the actual fluid pressure in the master cylinder 8 by receiving detection signals from the fluid-pressure sensor 20 and 21 and controls the rotation of the electric motor 17 of the electric booster 16 through feedback to bring the actual fluid pressure to a target fluid pressure based on the pedal operation amount.

In some cases, for example during the assembly or a maintenance of the brake apparatus, atmospheric air (air) may enter the brake pipelines 6 and 7 connecting the master cylinder 8 of the fluid-pressure generating device 5 and the wheel cylinders 1 to 4. Such air in the brake pipeline 6 or 7 causes an unnecessary time delay between the start of brake application and the actual start of braking, causing problems; for example, the driver may feel that something is wrong in his pedal operation. To solve such problems, auto manufacturing plants, for example, inspect brake apparatuses for air therein during piping operation. Such inspection, however, is inefficient and has been a problem to improve, as it involves, for example, inspectors actually stepping on or pressing the brake pedal to detect the presence of any air.

To detect any air in pipelines without having to step on the brake pedal, the inventors of the present invention looked into outputting a control signal (a control signal simulating brake pedal operation) from the ECU 19 to the electric motor 17 of the electric booster 16 to rotate the electric motor 17 and thereby generate fluid pressure in the master cylinder 8, which led the inventors to arrive at the present invention.

Figure 3:
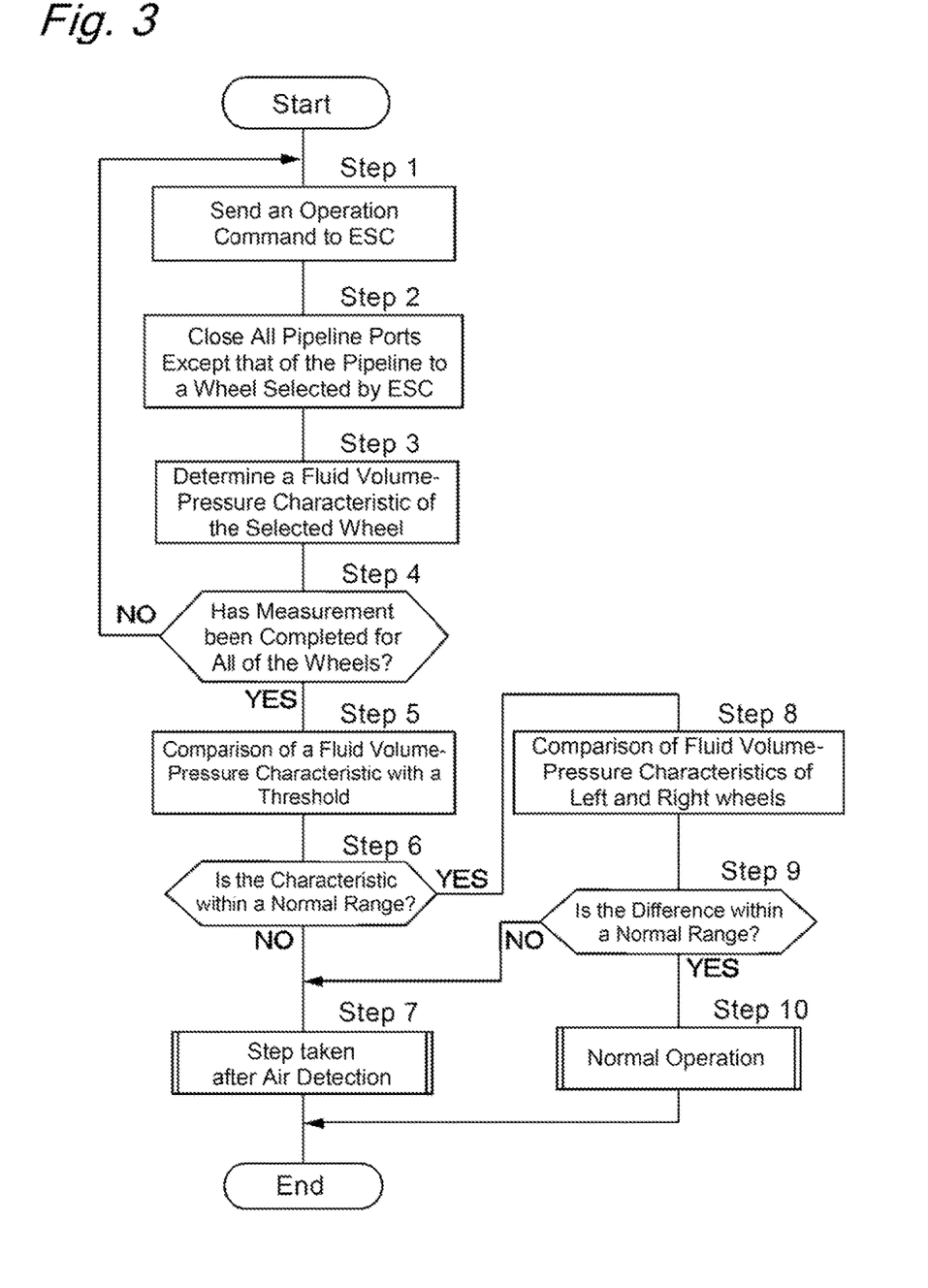
FIG. 3 is a flowchart of a process of detecting air in the brake pipelines.

To conduct a procedure for detecting any air, the first embodiment involves the ECU 19, when operated in a predetermined manner, feeding control signals in accordance to a program for air detection as shown in FIG. 3 to the electric booster 16 of the fluid-pressure generating device 5 and the ECO 22A of the ESC 22 to determine whether atmospheric air (air) is present in each of the brake pipelines 6 and 7 (more specifically, in each of the pipelines individually connected to the wheel cylinders 1 to 4)

Upon starting the procedure for air detection shown in FIG. 3, the ECU 19 sands a control command to the ECU 22A of the ESC 22 in step 1. This is followed by step 2 to close all of the pipeline ports, except that of the pipeline leading up to one wheel selected by ESC 22. More specifically, of the pressure-increase control valves 29, 29', 31, and 31' of the ESC 22 of FIG. 2, only the pressure-increase control valve 29 is kept open, while the other pressure-increase control valves 29', 31, and 31' are switched from the open position, as shown, into closed position. This puts only the wheel cylinder 1, of all of the wheel cylinders 1 to 4, into communication with the master cylinder 8 via the brake pipeline 6. The other wheel cylinders 2, 3, and 4, with their ports closed, are cut off from communication through the brake pipelines 6 and 7 with the master cylinder 8.

This is followed by subsequent step 3 to measure or determine a fluid volume-pressure characteristic of the pipelines (master-side pipeline 6A, brake pipeline 24, first pipe part 25, and wheel-side pipeline 6B) leading up to the wheel cylinder 1 on the selected wheel. This involves two steps: a step of transmitting a predetermined volume of brake fluid from the master cylinder 8 through the master-side pipeline 6A, brake pipeline 24, first pipe part 25, and wheel-side pipeline 6B to the wheel cylinder 1 by rotating the electric motor 17 of the electric booster 16 in response to a control signal sent from the ECU 19 to the electric motor 17 of the electric booster 16 (a step of brake fluid supply); and a step of detecting with the fluid pressure sensor 20 the pressure of brake fluid so transmitted in the brake pipeline 6 from the master cylinder 8 toward the wheel cylinder 1 (a step of fluid pressure detection).

The fluid volume-pressure characteristic measured or determined in step 3 shows that a value measured for the selected wheel by the fluid-pressure sensor 20 when the volume of brake fluid is a volume Va is, for example, fluid pressure Pa or Pb, such as those on the characteristic curves 47 and 48 of FIG. 4 as described above. The fluid pressure Pa on the solid characteristic curve 47 is that when no air is present in the brake pipeline 6 (the wheel-side pipeline 6B connected to the wheel cylinder 1), and the fluid pressure Pb on the dashed characteristic curve 48 is that when air is present in the brake pipeline 6 (the wheel-side pipeline 6B connected to the wheel cylinder 1).

Subsequent step 4 determines whether the fluid volume-pressure characteristic, such as the one described above, has been determined for all of the wheels. If no, the process goes back to repeat steps 1 to 4. That is, in step 2, of the pressure-increase control valves 29, 29', 31, and 31' of the ESC 22 of FIG. 2, only the pressure-increase control valve 29' is kept open, while the other pressure-increase control valves 29, 31, and 31' are switched into closed position. This puts only the wheel cylinder 2, of all of the wheel cylinders 1 to 4, into communication with the master cylinder 8 via the brake pipeline 7. The other wheel cylinders 1, 3, and 4, with their ports closed, are cut off from communication through the brake pipelines 6 and 7 with the master cylinder 8.

Subsequent step 3 determines a fluid volume-pressure characteristic of the pipelines (master-side pipeline 7A, brake pipeline 24', first pipe part 25', and wheel-side pipeline 7B) leading up to the wheel cylinder 2 on the selected wheel, using the fluid-pressure sensor 21, as described above. Subsequent step 4 determines whether the fluid volume-pressure characteristic has been determined for all of the wheels. If no, the process goes back to repeat steps 1 to 4 again.

This leads to a determination of a fluid volume-pressure characteristic of the pipelines (master-side pipeline 7A, brake pipeline 24', first pipe part 26', and wheel-side pipeline 7C) leading up to the wheel cylinder 3, as described above. Such determination of a fluid volume-pressure characteristic is also made for the pipelines (master-side pipeline 6A, brake pipeline 24, second pipe part 26, and wheel-side pipeline 6C) leading up to the wheel cylinder 4.

When determination has been made for all of the four wheels, meaning 'yes' in step 4, the process proceeds to subsequent step 5 to compare the fluid volume-pressure characteristic curve of each wheel with a respective threshold value. Steps 5 and 6 involve a step of determining the presence of any atmospheric air in a pipeline from the relation between the volume of brake fluid supplied from the fluid-pressure generating device 5 and the pressure of fluid brake detected by the fluid-pressure sensor 20 or 21 (a step of air detection). Alternatively, step 5 for determination of the presence of air may be carried out when fluid pressure has been detected for each wheel in step 3 before step 4.

In other words, step 5 compares with Pa and Pb the value detected by the fluid-pressure sensor 20 or 21 when the volume of fluid brake supplied by the fluid-pressure generating device 5 is Va, such as those on the characteristic curves 47 and 48 of FIG. 4, to determine whether the value detected is closer to Pa or Pb. Subsequent step 6 determines whether air is present in the pipeline to the selected wheel. This permits individual determination of whether air is present in each (namely, the pipeline to the selected wheel) of the pipelines connecting the wheel cylinders 1 to 4 and the master cylinder 8.

In doing so, step 6 determines whether the fluid volume-pressure characteristic of the pipelines to the selected wheel is within a normal range. That is, if the value detected by the fluid-pressure sensor 20 or 21 is closer to the fluid pressure Pa at fluid volume Va, step 6 gives "yes," meaning that the characteristic is determined as within the normal range where no air is present in the pipeline to the selected wheel. If the detected value is closer to the fluid pressure Pb, step 6 gives "no," meaning air is present. Then, in subsequent step 7, the presence of air in the pipeline to the selected wheel is indicated by issuing a warning sound, light, or the like as a "step after detection of air." This warning may be arranged to indicate the wheel connected to the pipeline containing air.

If "yes" in step 6, the process proceeds to subsequent step 8 to compare the fluid volume-pressure characteristic of a left wheel and that of a right wheel. For example, the fluid volume-pressure characteristics of the pipeline to the FL wheel cylinder 1 (a value detected by the fluid-pressure sensor 20 at fluid volume Va) and the pipeline to the FR wheel cylinder 2 (also a value detected by the fluid-pressure sensor 21 at fluid volume Va) are compared to determine the difference between the two detected values.

The same comparison is also made for the fluid volume-pressure characteristics of the pipeline to the RL wheel cylinder 3 (a value detected by the fluid-pressure sensor 21 at fluid volume Va) and the pipeline to the RR wheel cylinder 4 (also a value detected by the fluid-pressure sensor 20 at fluid volume Va) to determine the difference between the two detected values.

Subsequent step 9 compares the difference between two values detected by the fluid-pressure sensors 20 and 21 with a preset threshold (for example, a threshold set on the basis of an error in detection by the fluid-pressure sensors 20 and 21) to determine whether the difference is larger than the threshold, that is, whether she difference is within a normal range. If 'yes' in step 9, subsequent step 10 determines the result as normal, meaning no air is present in the brake pipelines 5 and 7, to terminate the procedure for air detection.

If "no" in step 9, meaning that the difference between the values measured by the fluid-pressure sensors 20 and 21 is greater than the threshold, the process goes back to step 7 to determine or detect that air is present in the pipeline whose value is the lower of the two values detected by the fluid-pressure sensors 20 and 21. This enables determination of which of the brake pipelines 6 and 7 contains air. As a result of this determination, in step 7, a warning sound, light, or the like is issued as a "step after detection of air" to indicate air is present in either or both of the brake pipelines 6 and 7. This warning may be arranged to indicate which of the pipelines 6 and 7 contains air.

In the first embodiment, the ECU 19 feeds control signals to the electric booster 16 of the fluid-pressure generating device 5 and the ESC 22 and controls establishment or cutting off of communication through the pressure-increase control valves 29, 29', 31, and 31', serving as a valve mechanism, to connect each of the wheel cylinders 1 to 4 in turn to the master cylinder 8. For each of the wheel cylinders 1 to 4, the stroke of the piston 10 or 11 of the master cylinder 8, or the volume of brake fluid proportional to the stroke, is detected by controlling the electric booster 16, and the fluid pressure is detected by the fluid-pressure sensor 20 or 21, so as to make comparison with the fluid volume-pressure characteristic of each of the wheel cylinders 1 to 4 and thereby defect any atmospheric air (air) in each pipeline.

This manner of the ECU 19 feeding control signals to the electric motor 17 of the electric booster 16 of the fluid-pressure generating device 5 and the ECU 22A of the ESC 22 improves the accuracy of determining whether air is present in each of the brake pipelines 6 and 7 (more specifically, in each of the pipelines individually connected to the wheel cylinders 1 to 4) from the fluid volume-pressure characteristic relation between the volume of brake fluid supplied by the fluid-pressure generating device 5 and the fluid pressure detected by the fluid-pressure sensor 20 or 21.

The above-described comparison of fluid volume-pressure characteristics can also be used for the brake pipelines 6 and 7 connected to the left and right front FL and FR wheel cylinders 1 and 2, and/or left and right rear RL and RR wheel cylinders 3 and 4 to detect with accuracy any air present in either the brake pipeline 6 or 7.

The first embodiment enables stable detection of any air in a pipeline, using a fluid volume-pressure characteristic of the volume of brake fluid supplied by the fluid-pressure generating device 5 and fluid pressure detected by the fluid-pressure sensor 20 or 21. This achieves a reduction in discrepancy caused by environmental factors, compared with the prior art which entirely depends, for example, on fluid pressure for determination, and also improves an S/N ratio.

The determination of whether the fluid volume-pressure characteristic of a selected wheel is in a normal range, with the ports of all of the other pipelines closed except that of the pipeline to the selected wheel, improves the accuracy of detecting air in the pipeline to the selected wheel so that even a small amount of air can be detected. The comparison of fluid volume pressure characteristics determined for each of the pipelines connected to the left and right wheel cylinders 1 and 2 (3, 4) eliminates a discrepancy from one brake apparatus (product) to another as an individual unit. This embodiment also facilitates automatic detection of air, making it possible to use existing manufacturing facilities for that purpose and bringing about other advantages.

Figure 5:
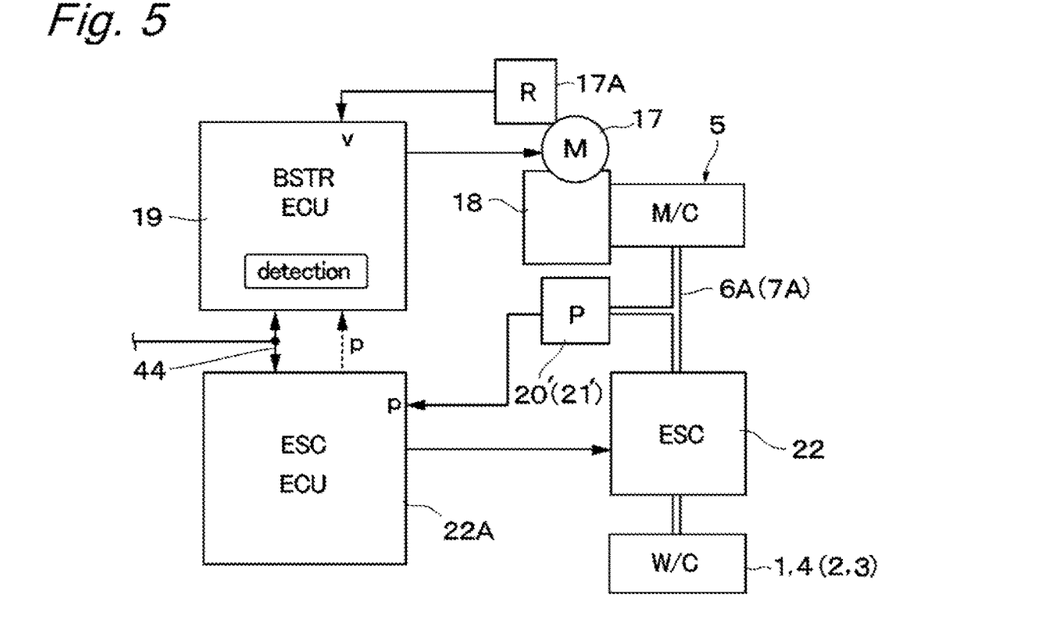
FIG. 5 is a schematic structural view of a first example of modification of the first embodiment.

In the first embodiment, the fluid-pressure sensors 20 and 21 are connected to the ECU 19 of the fluid-pressure generating device 5. However, as shown in FIG. 5, a schematic structural view of modified example 1, fluid-pressure sensors 20' and 21' may be connected to ECU 22A, instead. In this case, the ECU 22A detects fluid pressure p in response to measurement signals from the fluid-pressure sensors 20' and 21'. The ECU 22A in turn sends a detected brake fluid pressure p through the signal line 44 to the ECU 19. The ECU 19 then uses the brake fluid pressure p to conduct a process of detecting any air.

Figure 6:
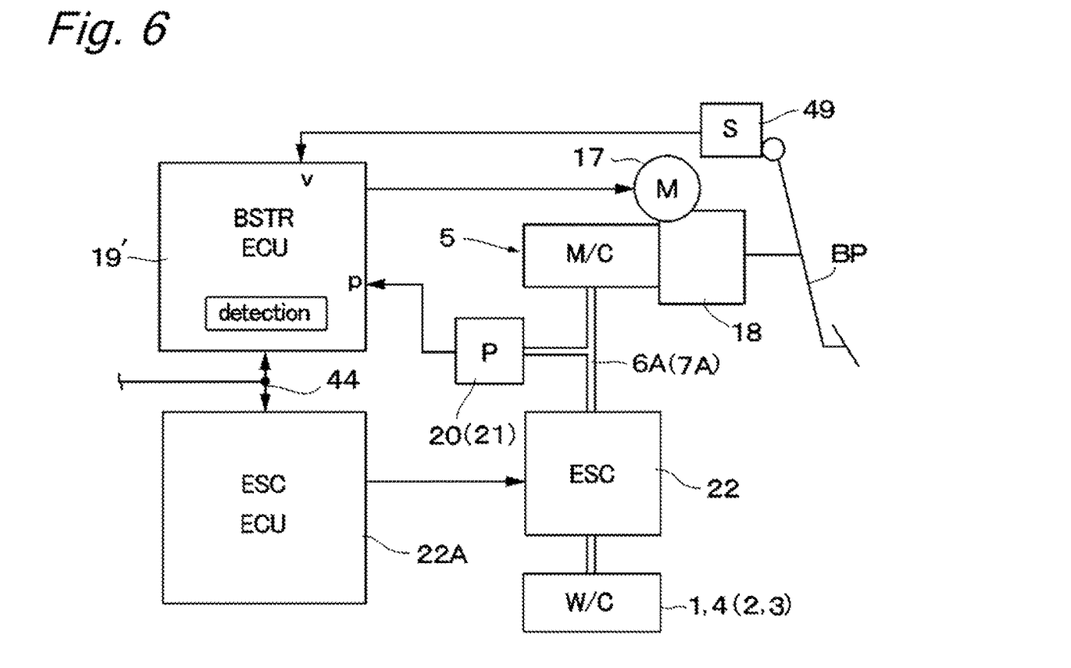
FIG. 6 is a schematic structural view of a second example of modification of the first embodiment.

To supply a predetermined volume of brake fluid to the wheel cylinder 1, the first embodiment determines a volume of brake fluid with the resolver 17A connected to the ECU 19. However, as shown in FIG. 6, a schematic structural view of modified example 2, a stroke sensor 49 (operation amount sensor) configured to detect the amount of operation of a brake pedal BP may be used instead to detect the volume v of brake fluid, provided that the brake pedal is moved (drawn inward) by operation of the fluid-pressure generating device 5. In this case, the process of detecting fluid pressure is performed when a result of detection with the stroke sensor 49 shows that the volume v of brake fluid, namely a supply of brake fluid by the fluid-pressure generating device 5 to a wheel cylinder, has reached a predetermined value, once the process of detecting air is started by an predetermined operation of the ECU 19'.

Figure 7:
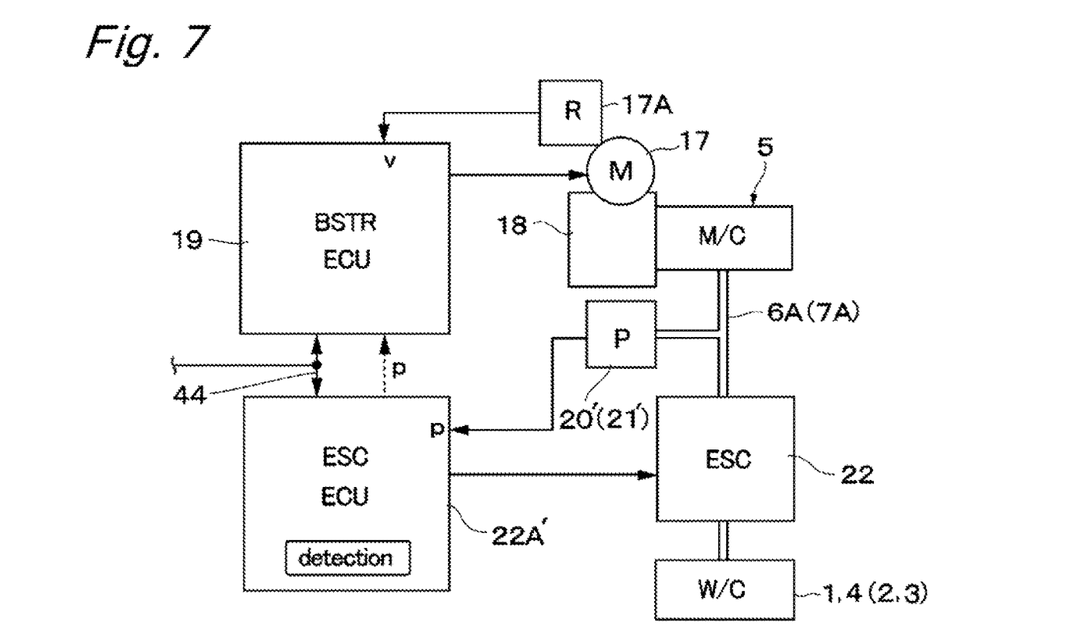
FIG. 7 is a schematic structural view of a third example of modification of the first embodiment.

The first embodiment uses the ECU 19 of the fluid-pressure generating device 5 to conduct the process of detecting air. However, as shown in FIG. 7, a schematic structural view of modified example 3, the ECU 22A' of the ESC 22 may be used instead to conduct the process of detecting air. In this case, as in modified example 1, the ECU 22A' uses fluid-pressure sensors 20' and 21' to detect one pressure p of brake fluid, and receives through the signal line 44 a detection signal indicative of the volume v of brake fluid detected by the ECU 19, so as to conduct the process of detecting air, as shown in FIG. 3.

Figure 8:
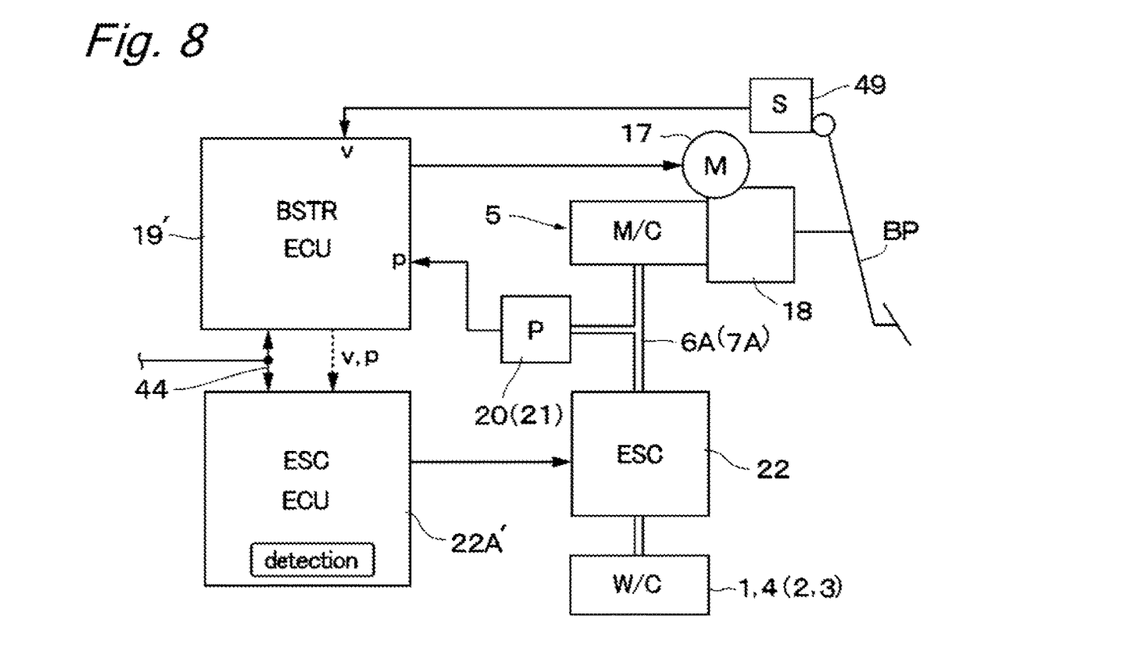
FIG. 8 is a schematic structural view of a fourth example of modification of the first embodiment.

FIG. 8 is a schematic structural view of modified example 4, in which, as in modified example 3, the process of detecting air is performed by ECU 22A' and, as in modified example 2, the ECU 19' is connected to the stroke sensor 49. In this case, signals indicative of the volume v of brake fluid and the pressure p of brake fluid detected by the ECU 19' are received through the signal line 44 to conduct the process of detecting air, as shown in FIG. 3. Other than the above modified examples 1 to 4, the first embodiment permits modifications in the modified examples to be selectively combined and incorporated into a brake apparatus.

Figure 9:
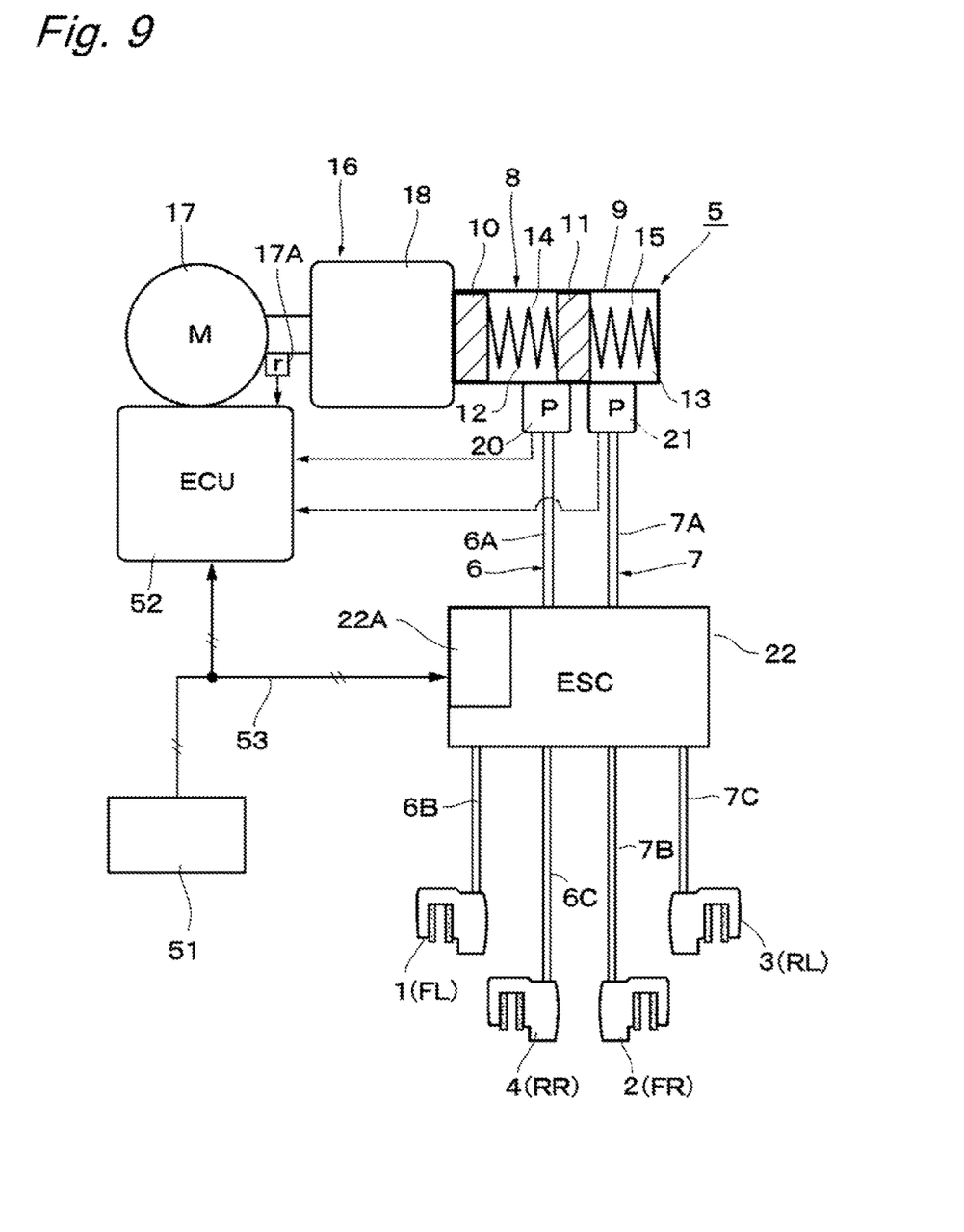
FIG. 9 is an overall structural view of a brake apparatus according to a second embodiment.

FIG. 5 shows a second embodiment, in which elements corresponding to those of the first embodiment are indicated by the same numerals, and descriptions thereof are omitted. The second embodiment is characterized by adding a command input device 51 that permits an inspector of any air in brake pipelines to input commands manually or by other means.

ECU 52 is substantially the same as the ECU 19 of the first embodiment. The electric booster 16 (electric motor 17) of the fluid-pressure generating device 5 is electrically actuated and controlled on the basis of the operation of the brake pedal and is also used to output control signals to the ESC 22, described later. In this case, however, the ECU 52 does not store a program or the like for determination process, such as the one shown in FIG. 3, in a storage (not shown) comprising, for example, ROM, RAM, a non-volatile memory, or the like.

The command input device 51 of the second embodiment is removably connected to the ECU 52 or ECU 22A or both by a signal line 53 for CAN communication or the like. More specifically, the command input device 51 comprises: an inspection device for installment, for example at an intermediate location along a manufacturing facility line or on an inspection line of an auto manufacturing plant; a handheld reader for failure inspection or the like used in auto repair shops, and the like. For connection with both the ECU 52 and the ECU 22A, the command input device 51 is connected to a diagnostic connector (DLC: data link connector) for self diagnosis of the vehicle. For connection with either the ECU 52 or ECU 22A, the command input device 51 is connected to the ECU 52 or ECU 22A by jumping between connectors for the signal line 44. The command input device 51 of the second embodiment, together with the ECU 52 and 22A, forms a controller. The command input device 51 comprises a storage (not shown) comprising, for example, ROM, RAM, a non-volatile memory, or the like. The storage stores: a program (see, e.g., FIG. 3) for determining whether any air as atmospheric air is present in the brake pipelines 6 and 7; and a characteristic curve (see, e.g., FIG. 4) showing a relation between the amount of brake fluid supplied in the pipelines 6 and 7 and fluid pressure, etc.

The command input device 51 so configured, together with the ECU 52 and 22A, forms air detection unit configured to detect the presence of air in the brake pipelines 6 and 7 on the basis of the relation between the volume of brake fluid and fluid pressure. Following an operation command from the command input device 51 when the command input device 51 is operated by the inspector, the ECU 52 outputs a control signal to perform a process similar to the process of air defection of, for example, FIG. 3 to the electric booster 16 of the fluid-pressure generating device 5, and the ECU 22A outputs such a control signal to determine whether atmospheric air (air) is present in each of the brake pipelines 6 and 7 (specifically, in each of the pipes individually connected to the wheel cylinders 1 to 4).

More specifically, the inspector uses the command input device 51 to send an operation command for air detection to the ECU 52 through the signal line 53. This operation signal is transmitted through the ECUs 52 and 22A to the electric booster 16 of the fluid-pressure generating device 5 and the ESC 22, respectively. Alternatively, the ESC 22 may be configured to receive an operation command directly from the command input device 51.

Upon receiving the operation command, the ESC 22 selectively opens in turn each one of the pressure-increase control valves 29, 29', 31, and 31', forming a valve mechanism, as described in the first embodiment, leaving the other control valves closed. In this condition, upon receiving the operation command, the ECU 52 turns on the electric motor 17 of the electric booster 16 to generate fluid pressure and transmit it from the master cylinder 8 into the brake pipelines 6 and 7, thereby measuring a fluid volume-pressure characteristic (see the characteristic curves 47 and 48 in FIG. 4) for each of the pipelines individually connected to the wheel cylinders 1 to 4.

The fluid volume-pressure characteristic so determined is transmitted via the signal line 53 for CAN communication or the like from the ECU 52 to the command input device 51. In this way, the inspector can receive from the command input device 51 the fluid volume-pressure characteristic of each of the pipelines individually connected to the wheel cylinders 1 to 4 to see if air is present in any of the pipelines.

The second embodiment thus detects any air in each of the pipelines individually connected to wheel cylinders 1 to 4, using the fluid volume-pressure characteristic of the volume of brake fluid supplied from the fluid-pressure generating device 5 and the pressure of fluid detected by the fluid-pressure sensor 20 or 21. This brings about the same effect as that of the first embodiment.

In particular, the second embodiment uses the command input device 51, capable of remote control, to detect air in the pipelines, eliminating the need for storing a determination processing program or the like, such as the one shown in FIG. 3, in the storage (not shown), which the ECU 19 of the first embodiment requires, and thus rendering it possible to use an existing controller (e.g., ECU 52). For detection of any air in the pipelines, a process of air detection similar to that of the first embodiment can be performed by transmitting an operation command for air detection from the command input device 51 via the signal line 53 to the ECU 52.

The second embodiment may be modified so that a fluid volume sensor, such as the resolver 17A and the stroke sensor 49, for measuring the volume of brake fluid, and a fluid pressure detector for brake fluid detection are connected as shown in the above-described modified examples 1 and 2 of FIGS. 5 and 6.

In the second embodiment, the command input device 51 is connected to a diagnosis connecter or a connector for the ECUs 52 and 22A. The diagnosis connector, however, may be connected to a radio interface to communicate radio signals between the interface and the command input device 51.

The first and second embodiments are described in terms of the electric booster 16 used to generate fluid pressure and send it from the master cylinder 8 into the brake pipelines 6 and 7. The present invention, however, is not limited to these embodiments and may be provided, instead, with a pump capable of flow rate measurement, such as a hydraulic booster.

Figure 2:
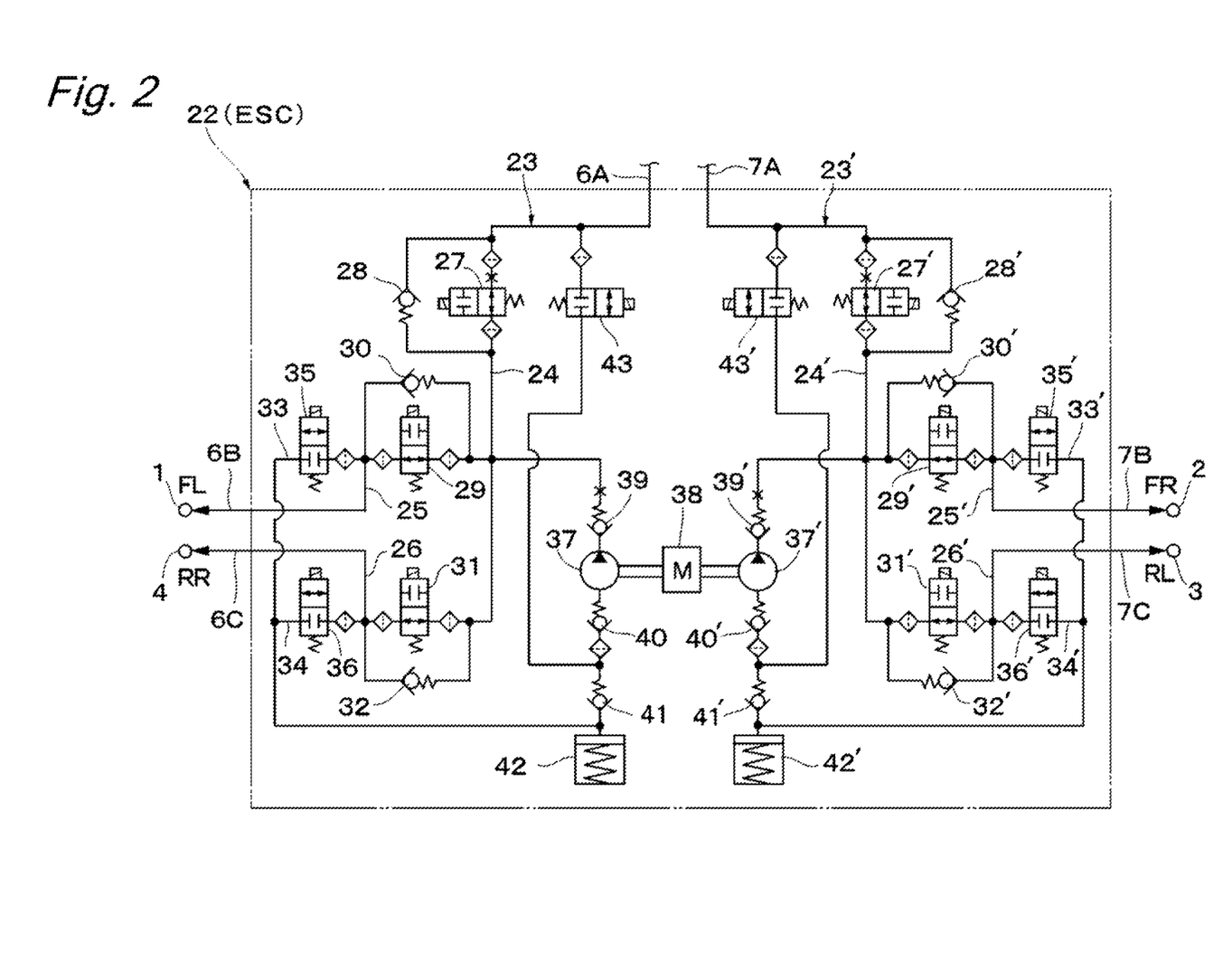
FIG. 2 is an enlarged circuit diagram of the ESC of FIG. 1.

Alternatively, the hydraulic pumps 37 and 37' of ESC 22 of FIG. 2, electric motor 38, etc. may be used to generate fluid pressure in the brake pipelines (the brake pipelines 24, 24', the first pipe parts 25 and 25', second pipe parts 26 and 26', wheel-side pipelines 6B, 6C, 7B, and 7C) for the detection by the ECU 22A of air in each of the pipelines individually connected to the wheel cylinders 1 to 4. In this case, the ESC 22 may be provided with a fluid volume sensor for brake fluid volume measurement and a wheel-cylinder pressure sensor for fluid pressure measurement, for example somewhere along the pipelines of the ESC 22. For such measurement of brake fluid volume, the volume of brake fluid supplied to the wheel cylinders 1 to 4 may be calculated by actuating the hydraulic pumps 37 and 37' with a fixed electric current for a predetermined period of time. In this case, the ESC 22 serves as a fluid-pressure generating device, and the ECU 22A as a controller.

The above embodiments are described in terms of the electric booster 16 used to generate the pressure of brake fluid in the master cylinder 8. The present invention is not limited to these embodiments and may be provided, instead, with, for example, an electric booster of brake-by-wire (BBW) type to serve as a fluid-pressure generating device.

The above embodiments cover the following aspects of the present invention. In one aspect, the present invention is characterized by a fluid-pressure supply device configured to select any of the plurality of wheel cylinders to be supplied with brake fluid, the fluid-pressure supply device being disposed at a location along the pipelines, and the air detection unit configured to detect any atmospheric air in the pipeline to each of the wheel cylinders.

In another aspect, the present invention is characterized by a fluid-pressure supply device configured to select any of the plurality of wheel cylinders to be supplied with brake fluid, the fluid-pressure supply device being disposed at a location along the pipelines, and the air detection unit configured to detect any atmospheric air in the pipeline to each side of left and right wheel cylinders of the vehicle.

In still another aspect, the present invention is characterized by the fluid-pressure generating device comprising a master cylinder configured to supply brake fluid and a booster for displacing the piston of the master cylinder and by the controller configured to control the booster. The controller is characterized by controlling the fluid-pressure supply device. The controller is also characterized by its inspection device provided outside of the vehicle. The fluid-pressure detection unit detects the pressure of brake fluid between the fluid-pressure generating device and the fluid-pressure supply device and is configured for connection to the controller.

REFERENCE SIGNS LIST

1-4. wheel cylinders
5. fluid-pressure generating device
6, 7. brake pipelines (pipelines)
8. master cylinder
9. cylinder body
10, 11. piston
12, 13. hydraulic chambers
16. electric booster (booster)
17. electric motor
17A. resolver (rational position sensor)
18. rotary-to-linear converter
19, 19', 52. ECUs (controllers)
20, 20', 21, 21'. hydraulic sensors (fluid-pressure detection unit)
22. ESC (fluid-pressure supply device)
22A, 22A'. ECUs (control boards)
24, 24'. brake pipelines (pipelines)
25, 25'. first pipe parts (pipelines)
26, 26'. second pipe parts (pipelines)
29, 29', 31, 31'. pressure-increase control valves (valve mechanism)
44, 53. signal lines
49. stroke sensor (operation amount sensor)
51. command input device (controller)

The invention claimed is:
1. A brake apparatus comprising:
a fluid-pressure generating device configured to supply brake fluid through pipelines to a plurality of wheel cylinders of a vehicle;
a fluid-pressure supply device configured to select any of the plurality of wheel cylinders to be supplied with brake fluid, the fluid-pressure supply device being located at an intermediate location along the pipelines;
a controller configured to output a control signal to the fluid-pressure generating device and configured to control a volume of brake fluid supplied from the fluid-pressure generating device;
a fluid-pressure detection unit configured to detect a pressure of brake fluid when the brake fluid is supplied by the fluid-pressure generating device toward the wheel cylinders; and
an air detection unit configured to detect any air in the pipelines on the basis of a relation between the volume of brake fluid when the controller controls the fluid-pressure generating device to generate a predetermined volume of brake fluid, and a fluid pressure detected by the fluid-pressure detection unit, wherein
the air detection unit is configured to detect individually, for each of the wheel cylinders on a left side of the vehicle and the wheel cylinders on a right side of the vehicle, any air in the pipelines corresponding respectively to the plurality of wheel cylinders, on the basis of a difference between the relation between the volume of brake fluid and the fluid pressure that corresponds to the wheel cylinder of the plurality of wheel cylinders on a front side of the vehicle, and the relation between the volume of brake fluid and the fluid pres- sure that corresponds to the wheel cylinder of the plurality of wheel cylinders on a rear side of the vehicle.

2. A brake apparatus according to claim 1, wherein: the fluid-pressure generating device comprises a master cylinder configured to supply brake fluid and a booster configured to displace a piston of the master cylinder; and the controller is configured to control the booster.

3. A brake apparatus according to claim 1, wherein the controller is configured to control the fluid-pressure supply device.

4. A brake apparatus according to claim 1, wherein the air detection unit is included in an inspection device provided outside of the vehicle, and the air detection unit detects the air in the pipelines when the controller and the inspection device are connected to each other.

5. A brake apparatus according to claim 1, wherein the fluid-pressure detection unit is configured to detect a pressure of brake fluid between the fluid-pressure generating device and the fluid-pressure supply device and is connected to the controller.

6. A brake apparatus comprising:
a master cylinder configured to generate a pressure of brake fluid by displacing a piston and supplying the pressure of brake fluid to at least two wheel cylinders;
a booster configured to actuate the piston of the master cylinder;
a controller configured to control the booster on the basis of operation of a brake pedal, the controller being configured to control a volume of brake fluid supplied from the master cylinder by controlling a stroke of the piston;
a valve mechanism disposed to establish and cut off communication through pipelines between the master cylinder and each of the wheel cylinders, the establishment and cutting off of communication being controlled on the basis of a signal from the controller; and
a fluid-pressure detection unit configured to detect a pressure of brake fluid when the brake fluid is transmitted from the master cylinder to each of the wheel cylinders and output a detection signal to the controller; wherein
the controller is configured to connect each of wheel cylinders on a left side of a vehicle and wheel cylinders on a right side of the vehicle in turn to the master cylinder by controlling establishment and cutting off of communication through the valve mechanism, determine a characteristic of a piston stroke of the master cylinder and a fluid pressure detected by the fluid-pressure detection unit by controlling the booster for each of the left side and the right side, and thereby detect any air in each pipeline on the basis of the characteristic of each wheel cylinder, and
the controller is further configured to detect, for each of the wheel cylinders on the left side of the vehicle and the wheel cylinders on the right side of the vehicle, any air in the pipelines corresponding respectively to the two wheel cylinders, on the basis of a difference between the relation between the volume of brake fluid and the pressure of brake fluid which corresponds to the wheel cylinder of the at least two wheel cylinders on a front side of the vehicle, and the relation between the volume of brake fluid and the pressure of brake fluid which corresponds to the wheel cylinder of the at least two wheel cylinders on a rear side of the vehicle.

7. A device for detecting air in pipelines of a brake apparatus comprising:
a fluid-pressure generating device configured to supply brake fluid via the pipelines to a plurality of wheel cylinders;
a fluid-pressure supply device configured to select any of the plurality of wheel cylinders to be supplied with brake fluid, the fluid-pressure supply device being located at an intermediate location along the pipelines; and
a controller configured to control the fluid-pressure generating device, the controller being configured to control a volume of brake fluid supplied from the fluid-pressure generating device, wherein
the device for detecting air is configured to:
supply a predetermined volume of brake fluid from the fluid-pressure generating device through a pipeline to a wheel cylinder;
detect a pressure of brake fluid when the brake fluid is supplied by the fluid-pressure generating device toward the wheel cylinder;
connect each of the wheel cylinders on a left side of a vehicle and wheel cylinders on a right side of the vehicle in turn to the master cylinder by controlling the fluid-pressure supply device; and
detect, for each of the wheel cylinders on a left side of a vehicle and the wheel cylinders on a right side of the vehicle, any air in the pipelines corresponding respectively to the two wheel cylinders, on the basis of a difference between the relation between the volume of brake fluid and the pressure of brake fluid which corresponds to the wheel cylinder of the at least two wheel cylinders on a front side of the vehicle, and the relation between the volume of brake fluid and the pressure of brake fluid which corresponds to the wheel cylinder of the at least two wheel cylinders on a rear side of the vehicle.

* * * * *